United States Patent
Fish

(10) Patent No.: US 7,633,259 B2
(45) Date of Patent: Dec. 15, 2009

(54) METHOD AND APPARATUS FOR OPERATING ELECTRICAL MACHINES

(75) Inventor: William E. Fish, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 175 days.

(21) Appl. No.: 11/461,016

(22) Filed: Jul. 31, 2006

(65) Prior Publication Data

US 2008/0024941 A1     Jan. 31, 2008

(51) Int. Cl.
*H02P 6/00*     (2006.01)
(52) U.S. Cl. .................. 318/721; 318/701; 318/727; 318/811; 361/33; 361/56; 361/119
(58) Field of Classification Search ............ 318/400.08, 318/727, 811, 701, 721; 361/23, 30, 33, 361/56, 111, 160, 119; 702/100
See application file for complete search history.

(56) References Cited

U.S. PATENT DOCUMENTS

| | | | | |
|---|---|---|---|---|
| 4,546,305 A | * | 10/1985 | Goddijn et al. | 323/299 |
| 4,750,077 A | | 6/1988 | Amagasa | |
| 4,849,845 A | * | 7/1989 | Schmitt | 361/56 |
| 4,870,534 A | * | 9/1989 | Harford | 361/58 |
| 5,093,597 A | | 3/1992 | Hughes | |
| 5,164,829 A | * | 11/1992 | Wada | 348/626 |
| 5,378,967 A | * | 1/1995 | Naito | 318/400.08 |
| 5,532,574 A | * | 7/1996 | Wolfe et al. | 322/37 |
| 5,539,604 A | * | 7/1996 | Clark et al. | 361/56 |
| 5,550,730 A | | 8/1996 | Seki | |
| 5,644,461 A | * | 7/1997 | Miller et al. | 361/56 |
| 5,731,966 A | | 3/1998 | Liu | |
| 5,784,236 A | * | 7/1998 | Tardiff et al. | 361/56 |
| 5,894,211 A | * | 4/1999 | Sugden | 318/701 |
| 5,909,098 A | * | 6/1999 | Konecny et al. | 318/811 |
| 6,020,735 A | * | 2/2000 | Barnett et al. | 324/133 |
| 6,055,147 A | * | 4/2000 | Jeffries et al. | 361/103 |
| 6,160,694 A | * | 12/2000 | Crespi et al. | 361/111 |
| 6,255,901 B1 | * | 7/2001 | Steinhagen et al. | 329/348 |
| 6,680,839 B2 | * | 1/2004 | Napiorkowski | 361/119 |
| 6,810,345 B2 | * | 10/2004 | Matsumura et al. | 702/100 |
| 6,856,101 B1 | * | 2/2005 | Hitchcock | 315/227 R |
| 6,867,436 B1 | * | 3/2005 | Matteson et al. | 257/106 |
| 6,891,706 B2 | * | 5/2005 | Leonov | 361/20 |
| 6,969,283 B2 | * | 11/2005 | Schmidt | 439/687 |
| 7,009,831 B2 | * | 3/2006 | Walters | 361/111 |
| 7,084,486 B2 | * | 8/2006 | Walters | 257/656 |

(Continued)

*Primary Examiner*—Paul Ip
(74) *Attorney, Agent, or Firm*—Armstrong Teasdale LLP

(57) ABSTRACT

A method and associated apparatus for operating an electrical machine includes providing a brushless excitation system including at least one rectifier having at least one diode. The method also includes providing at least one voltage amplitude limiter assembly including at least one resistor and at least one transient voltage suppressor (TVS) electrically coupled with the at least one resistor to form at least one voltage suppression unit. The method further includes transmitting an electrical signal having a current and a voltage to each voltage suppression unit, the voltage having an amplitude. The method also includes electrically coupling the at least one voltage amplitude limiter assembly to the at least one diode. The method further includes transmitting the electrical signal through the rectifier and the voltage suppression unit such that voltage amplitude excursions of the electrical signal are facilitated to be reduced.

18 Claims, 2 Drawing Sheets

U.S. PATENT DOCUMENTS

| | | | |
|---|---|---|---|
| 7,164,568 B2 * | 1/2007 | Walters .................... | 361/111 |
| 7,187,012 B2 * | 3/2007 | Walters .................... | 257/106 |
| 7,361,942 B1 * | 4/2008 | Matteson et al. ........... | 257/106 |
| 2002/0125507 A1 * | 9/2002 | Washburn et al. .......... | 257/213 |
| 2003/0004666 A1 * | 1/2003 | Matsumura et al. ........ | 702/100 |
| 2004/0210410 A1 * | 10/2004 | Matsumura et al. ........ | 702/100 |
| 2004/0264087 A1 | 12/2004 | Bishop | |
| 2005/0024103 A1 * | 2/2005 | Nascimento ............... | 327/112 |
| 2006/0132992 A1 * | 6/2006 | Laville et al. ............... | 361/18 |
| 2007/0077738 A1 * | 4/2007 | Tanielian et al. ........... | 438/523 |
| 2007/0146958 A1 * | 6/2007 | Babcock et al. ............ | 361/160 |
| 2008/0079417 A1 * | 4/2008 | Viitanen .................... | 324/76.53 |

* cited by examiner

US 7,633,259 B2

METHOD AND APPARATUS FOR OPERATING ELECTRICAL MACHINES

BACKGROUND OF THE INVENTION

This invention relates generally to electrical machines and more particularly, to methods and apparatus for operating electrical machines.

At least some known electric power generators include a stator and a rotor coupled to an external excitation system that, in some configurations, includes a brushless exciter that includes a rotating armature and a diode rectifier. Specifically, at last some brushless exciters are electrically connected to a generator field winding coupled to the generator rotor. The rotating armature and diode rectifier are sometimes rotatably coupled to the generator rotor is a configuration in which the diode rectifier is configured as a diode wheel and wherein the rotating armature, the diode wheel, and the generator rotor are electrically connected. An alternating current (AC) signal generated within the rotating armature is transmitted to the diode wheel wherein the AC current signal is rectified to a direct current (DC) signal. The DC signal is transmitted to the generator field windings to facilitate the generation of electric power.

Some known diode wheels include a plurality of diodes that generally permit electrical current flow in one direction and inhibit current flow in the opposite direction. During periods when electrical current flow is permitted, an electrical signal with predetermined voltages and currents is transmitted and the diode is sometimes referred to as being in a conductive state. During periods when electrical current flow is inhibited, the diode is sometimes referred to as being in a non-conducting state. As the rectifying diode transitions from a conductive state to a non-conductive state, an electrical current and voltage excursion may be generated. More specifically, such a signal is sometimes referred to as a reverse recovery signal, and such voltage excursions are typically referred to as commutation voltage spikes. When the commutation voltage spikes are transmitted from the diodes to the generator field windings, a voltage threshold of electrical insulation associated with the rotor winding may be exceeded. Over time, continued exposure to voltage spikes may cause the insulation to breakdown. To facilitate reducing the transmission of voltage spikes to the rotor windings, some diode wheels include snubber circuits including capacitors. However, known capacitors may not have a sufficient response time characteristics and/or may be of such mass and size as to inhibit the operation of the diode wheel.

BRIEF DESCRIPTION OF THE INVENTION

In one aspect, a method of operating an electrical machine is provided. The method includes providing a brushless excitation system including at least one rectifier having at least one diode. The method also includes providing at least one voltage amplitude limiter assembly including at least one resistor and at least one transient voltage suppressor (TVS) electrically coupled with the at least one resistor to form at least one voltage suppression unit. The method further includes transmitting an electrical signal having a current and a voltage to each voltage suppression unit, the voltage having an amplitude. The method also includes electrically coupling the at least one voltage amplitude limiter assembly to the at least one diode. The method further includes transmitting the electrical signal through the rectifier and the voltage suppression unit such that voltage amplitude excursions of the electrical signal are facilitated to be reduced.

In another aspect, a voltage amplitude limiter assembly is provided. The assembly includes at least one resistor and at least one transient voltage suppressor (TVS) electrically coupled to the at least one resistor to form at least one voltage suppression unit. The voltage suppression unit is configured to reduce a voltage amplitude excursion of an electrical signal received that exceeds a predetermined voltage amplitude.

In a further aspect, a brushless excitation system for an electrical machine is provided. The electrical machine has an excitation field apparatus. The system includes an electrical power source and a diode rectifier electrically coupled to the electrical power source and the excitation field apparatus. The system also includes a voltage amplitude limiter assembly electrically coupled to the diode rectifier. The assembly includes at least one resistor and at least one transient voltage suppressor (TVS) electrically coupled to the at least one resistor to form at least one voltage suppression unit. The voltage suppression unit is configured to reduce a voltage amplitude excursion of an electrical signal received that exceeds a predetermined voltage amplitude.

DETAILED DESCRIPTION OF THE INVENTION

Figure 1:
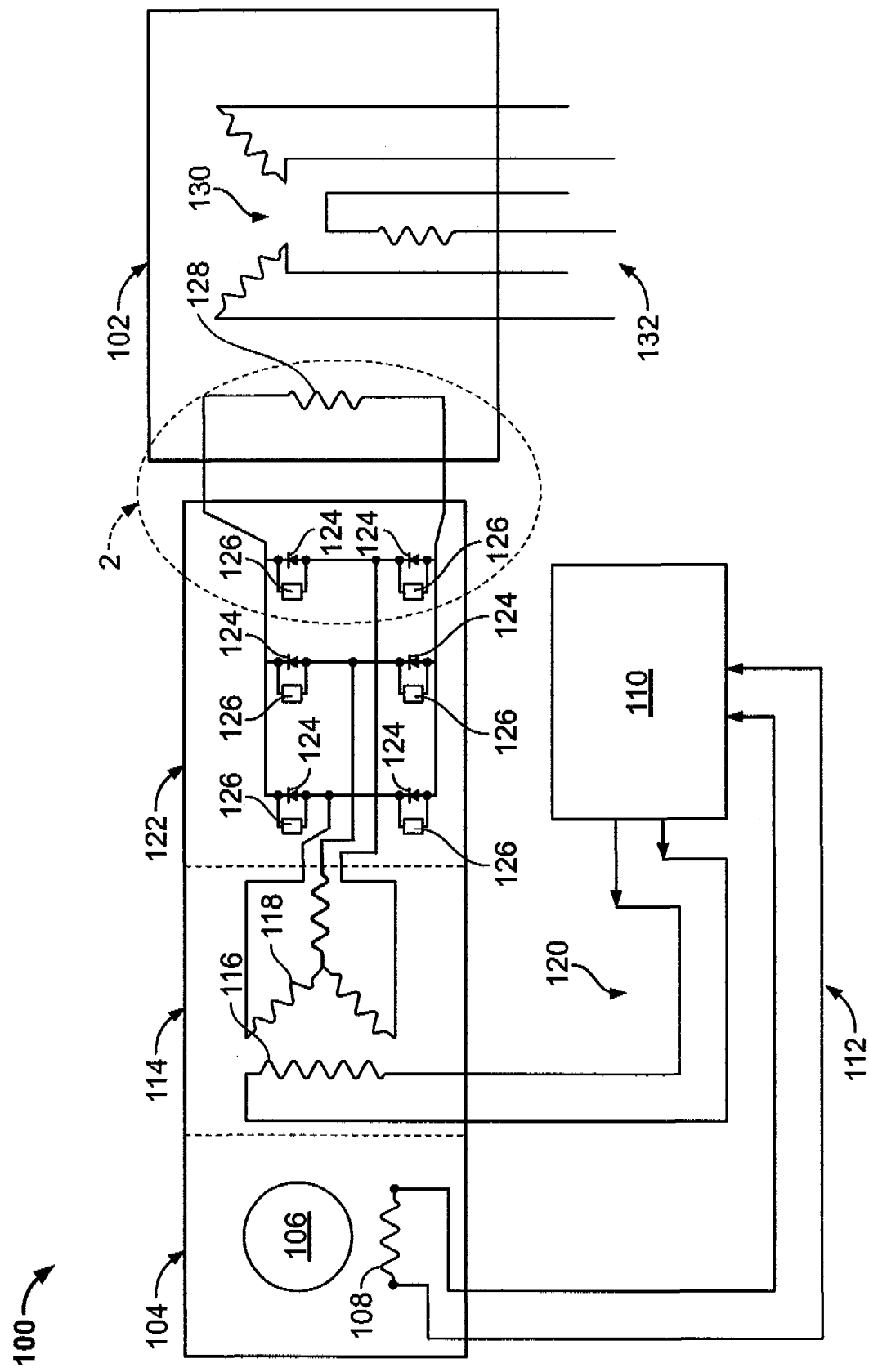
FIG. 1 is a schematic view of an exemplary generator excitation system.
Figure 2:
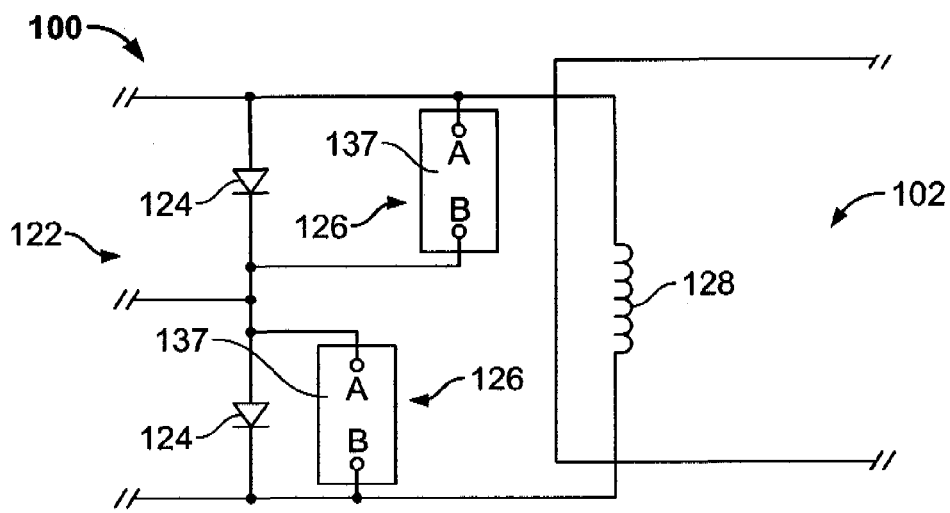
FIG. 2 is an enlarged schematic view of a portion of the generator excitation system shown in FIG. 1 and taken along area 2.

FIG. 1 is a schematic view of an exemplary generator brushless excitation system 100 that is used to provide excitation power to an electric machine 102. FIG. 2 is an enlarged schematic view of a portion of system 100. In the exemplary embodiment, and hereinafter, electric machine 102 is a three-phase electric power generator 102. Alternatively, electric machine 102 is an electrically-driven motor (not shown in FIG. 1) that includes a brushless excitation scheme. An electric power source 104 generates and transmits electric power for use within system 100. In the exemplary embodiment, power source 104 is a permanent magnet generator (PMG) that generates electrical alternating current (AC) power for use within system 100. Alternatively, system 100 is a static excitation system that includes a power source that is any electric power delivery apparatus that enables system 100 to function as described herein, including but not limited to, batteries. PMG 104 includes a rotor 106 and a stator 108. In the exemplary embodiment, rotor 106 includes a plurality of permanent magnets (not shown in FIG. 1) that generate a magnetic field around rotor 106. Rotor 106 is magnetically coupled with stator 108, and stator 108 includes a plurality of windings (not shown in FIG. 1) that are electrically coupled to a voltage regulator 110 via electrical conduits 112.

System 100 also includes an exciter 114 including a stator 116 and a three-phase rotor 118. Stator 116 and rotor 118 each include a plurality of windings (not shown in FIG. 1). Voltage regulator 112 is electrically coupled with the stator windings via electrical conduits 120. Exciter stator 116 is magnetically coupled with rotor 118 and rotor 118 is electrically connected to an electric current rectifier 122. In the exemplary embodiment, rectifier 122 is a diode rectifier 122. Alternatively, rectifier 122 may use any other known AC rectification method. Diode rectifier 122 includes a plurality of diodes 124 positioned such that each of the three electrical phases of rotor 118 is electrically connected to two diodes 124. Specifically, each phase of rotor 118 is electrically coupled to two diodes 124 that are electrically coupled in series with each other, wherein each pair of series diodes 124 is electrically coupled to two additional pairs of series diodes 124 in a parallel configuration. Alternatively, diode rectifier 122 is a series redundant diode rectifier (not shown) that includes a plurality of diodes 124 positioned such that each of the three electrical phases of rotor 118 is electrically connected to four diodes 124. Specifically, each phase of rotor 118 is electrically coupled to four diodes 124 that are electrically coupled in series with each other, wherein each quartet of series diodes 124 is electrically coupled to two additional quartets of series diodes 124 in a parallel configuration. Further, alternatively, diode rectifier 122 is a parallel redundant diode rectifier (not shown) that includes a plurality of diodes 124 positioned such that each of the three electrical phases of rotor 118 is electrically connected to four diodes 124. Specifically, each phase of rotor 118 is electrically coupled to four diodes 124 wherein the four diodes 124 are configured as two pairs of diodes 124 with two diodes 124 in series with each other. Each pair of diodes 124 is electrically coupled in parallel with another associated pair of diodes 124 for a phase of rotor 118. Each quartet of diodes 124 associated with each of the three phases of rotor 118 are electrically coupled in parallel with each other. In any configuration of diodes 124, a voltage amplitude limiter assembly 126 is electrically connected in parallel with each of diodes 124.

Generator 102 includes an excitation field apparatus 128, a stator 130 magnetically coupled to field apparatus 128, and a plurality of electrical transmission conduits 132. Diodes 124 and assemblies 126 are electrically coupled to generator excitation field apparatus 128. In the exemplary embodiment, no snubber components are coupled between diodes 124 and field apparatus 128. In an alternative embodiment, system 100 includes snubber components that include, but are not limited to, at least one capacitor (not shown in FIG. 1) coupled in parallel with field apparatus 128.

In the exemplary embodiment, field apparatus 128, diode rectifier 122, exciter rotor 118 and PMG rotor 106 are rotatably coupled to a common shaft coupled to a drive apparatus (neither shown in FIG. 1). In such an embodiment, diode rectifier 122 is sometimes referred to as a diode wheel. In the exemplary embodiment, the drive apparatus may include, but is not limited to including, a steam turbine and/or a gas turbine. Alternatively, the drive apparatus is a wind turbine and/or a hydroelectric turbine.

During operation, PMG rotor 106 is rotated by the common shaft and the magnetic field generated by rotor 106 permanent magnets induces a voltage within the plurality of windings of stator 108. The induced voltage within stator 108 generates an output signal that includes an electric AC current that is transmitted to voltage regulator 110 via conduits 112. Voltage regulator 110 compares the PMG output signal transmitted from PMG 104 to at least one predetermined operational parameter associated with system 100, rectifies the AC signal received from PMG 104, and transmits a direct current (DC) voltage regulator signal to exciter stator 116. Stator 116 generates a magnetic field that interacts with exciter rotor 118. Rotation of rotor 118 causes a voltage to be generated within rotor 118 that subsequently generates a three-phase AC exciter output signal that includes an electrical current.

The exciter output signal is transmitted to diode wheel 122 wherein diodes 124 rectify the AC exciter output signal to a DC output signal. Voltage amplitude limiter assemblies 126 facilitate reducing the effects of any voltage and current excursions of the diode wheel output signal that may be initiated by diodes 124, as described in more detail below. In the exemplary embodiment, diode wheel 122 includes six diodes 124 and the diode wheel 122 output signal nominally has a voltage amplitude that is between approximately 400 volts to 800 volts. In an alternative embodiment, diode wheel has twelve diodes 124 and the diode wheel 122 output signal nominally has a voltage amplitude that is between approximately 800 volts to 1600 volts. Alternatively, the number of diodes 124 and the voltage amplitude of the diode wheel 122 output signal are variably selected to facilitate operation of system 100 as described herein. The diode wheel output signal is transmitted to the windings of field apparatus 128 which generates a magnetic field that interacts with stator 130. The voltage induced within stator 130 causes a three-phase AC electric power signal to be generated that is transmitted to at least one electric load via transmission conduits 132.

Figure 3:
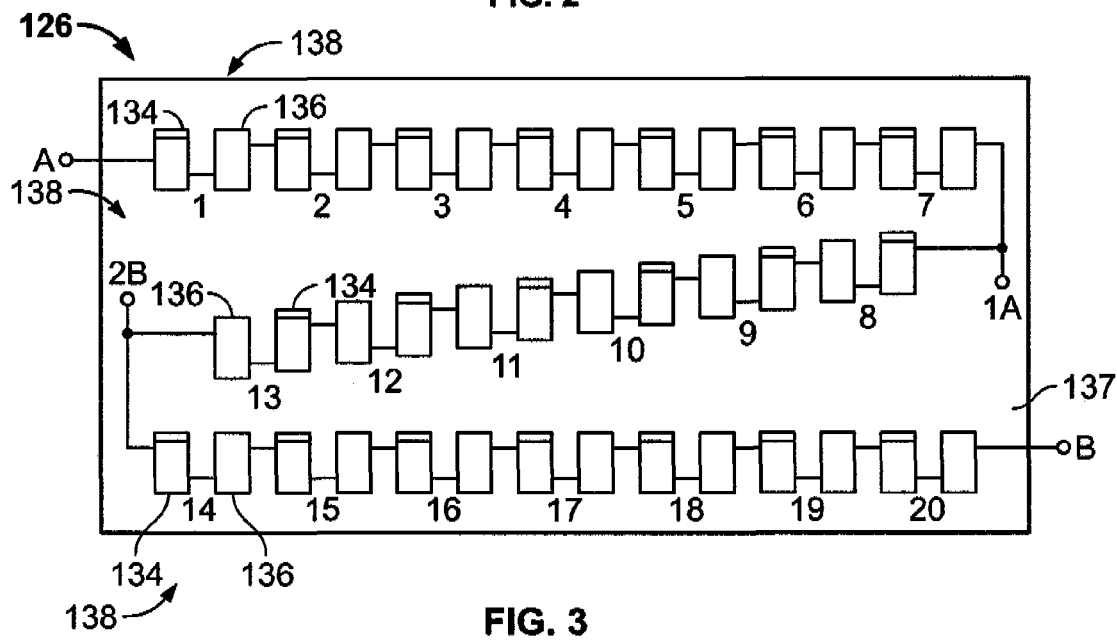
FIG. 3 is a schematic view of an exemplary voltage amplitude limiter assembly that may be used with the generator excitation system shown in FIG. 1.
Figure 4:
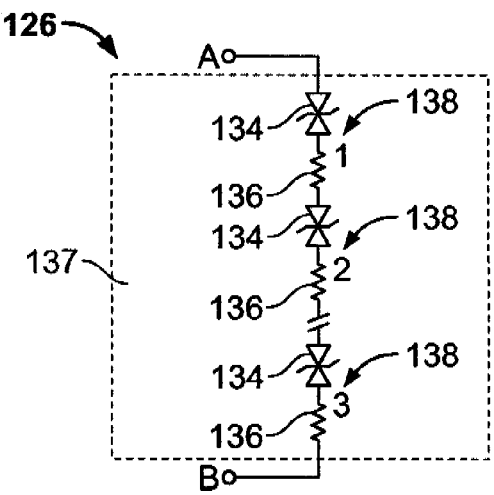
FIG. 4 is an electrical schematic view of the voltage amplitude limiter assembly shown in FIG. 3.

FIG. 3 is a schematic view of an exemplary voltage amplitude limiter assembly 126. FIG. 4 is an electrical schematic view of voltage amplitude limiter assembly 126. Generator field apparatus 128 is illustrated for perspective. Terminals A and B of each voltage amplitude limiter assembly 126 illustrate exemplary connections of assemblies 126 within system 100. Terminals 1A and 2B illustrate exemplary test connections of assemblies 126 that facilitate a high voltage ratio test of assemblies 126.

Assemblies 126 each include a plurality of transient voltage suppressors (TVS) 134 and resistors 136 coupled to a circuit card 137. Specifically, in the exemplary embodiment, each TVS 134 is electrically connected to an associated resistor 136. Moreover, each TVS 134 and resistor 136 combination forms a voltage suppression unit 138. In the exemplary embodiment, each assembly 126 includes twenty TVS 134 and twenty resistors 136 that are electrically connected in series in an alternating manner that forms twenty units 138. For illustrative purposes, each unit 138 is labeled 1 through 20 in FIGS. 3 and 4.

In the exemplary embodiment, each TVS 134 is a 400 watt, bidirectional, linear response, surface mounted, SMAJ 130C model of silicon avalanche-type diode having a 130 volt reverse stand-off voltage, sometimes referred to as threshold voltage or maximum working voltage. Alternatively, any device that facilitates operation of assemblies 126 as described herein may be used. The plurality of TVSs 134 positioned on card 137 in a series configuration load share such that the reverse stand-off voltages of each TVS 134 is additive. As such, in the exemplary embodiment, each assembly 126 has a 2600 volt reverse stand-off voltage. In some embodiments, a response time of TVS 134 may exhibit an improvement over some known polypropylene capacitors.

In the exemplary embodiment, each resistor 136 has a resistance-to-electrical current flow of approximately 65 ohms such that each assembly 126 has a total resistance of at least 1300 ohms. Alternatively, any device that facilitates operation of assemblies 126 as described herein may be used. Each resistor 136 facilitates limiting current flow through assemblies 126 during voltage suppression events when the reverse stand-off voltage threshold of assemblies 126 is attained and/or exceeded. As such, resistors 136 facilitate preventing 126 current ratings of assembly 126 from being exceeded while voltage amplitude excursions are also mitigated. Moreover, each resistor 136 is positioned to facilitate reducing electrical current flow through each adjacent TVS 134.

The plurality of TVSs 134 are connected in series with an associated resistor 136 to form a voltage suppression unit 138. In the exemplary embodiment, assemblies 126 include twenty units 138. Alternatively, assemblies 126 may include any number of units 138 that facilitate operation of assemblies 126 as described herein. Configuring assemblies 126 with a plurality of units 138, as contrasted to one large unit 138, facilitates mass distribution within circuit card 137 such that balanced rotation of diode wheel 122 is facilitated. Moreover, configuring assemblies 126 in this manner facilitates each resistor 136 cooperating with each TVS 134 to facilitate reducing electric current flow through each unit 138. Also, such configuration facilitates an increase of a voltage drop across each resistor 136 to mitigate a potential for exceeding a pre-determined voltage breakdown rating for each resistor 136. Moreover, such voltage drop across at least one resistor 136, or a voltage drop across an auxiliary resistor (not shown) with a pre-determined resistance to electric current flow embedded within circuit card 137, may be used to facilitate auxiliary functions that include, but are not limited to, operator notifications, for example, warnings and alarms. Furthermore, such configuration facilitates pre-determined heat dissipation characteristics that include, but are not limited to, a rate of heat dissipation per unit area of card 137.

In the exemplary embodiment, assemblies 126 are approximately 7.62 centimeters (cm) (3 inches (in)) in length, approximately 3.81 cm (1.5 in) in height, and approximately 18 cm (7.125 in) in depth (including TVS 134 and resistor 136 heights) and have a weight of approximately 10 grams (0.35 ounces) each to facilitate installation within diode wheel 122. More specifically, the weight of assembly 126 is approximately one-one-hundredth the weight of some known capacitors and facilitates balanced rotation of diode wheel 122 and generator 102. Positioning TVS 134 and resistors 136 in a Z-configuration, as illustrated in FIG. 3, facilitates reducing a potential for electrical flashover between any of TVS 134 and any of resistors 136 while facilitating the pre-determined mass and dimensions of assemblies 126 as described herein. Alternatively, assemblies 126 have any dimensions and weight that facilitates operation of system 100 as described herein. Also, alternatively, a single assembly 126, or a plurality of assemblies 126 electrically connected in series, may be configured appropriately for installation within generator 102 such that assemblies 126 are electrically connected in parallel across field apparatus 128. The exemplary and alternative configurations of assemblies 126 mitigate adding excess mass to high speed diode wheel 122 and generator 102, respectively. Therefore, assemblies 126 facilitate a mass balancing of diode wheel 122 and generator 102 that facilitates balanced rotation of diode wheel 122 and generator 102. Positioning a plurality of assemblies 126 within diode wheel 122 facilitates suppressing voltage amplitude transients near the source of the transients, i.e., diodes 124, while protecting insulation (not shown) along the electrical connection between diodes 124 and field apparatus 128. Alternatively, positioning at least one assembly 126 on the common rotor across field apparatus 128 facilitates suppressing voltage amplitude transients near a generator field apparatus 128 electrical insulation (not shown).

In the exemplary embodiment, TVS 134 and resistors 136 are soldered to circuit card 137 and subsequently encapsulated in at least one epoxy layer (not shown) formed over substantially all of assembly 126. The epoxy layer facilitates reducing surface contamination and the effects of mechanical forces that may act on assembly 126 as diode wheel 122 and generator 102 rotate.

Assemblies 126 are electrically configured with a bidirectional polarity that facilitates suppression of voltage amplitude excursions with either a positive or negative polarity in either direction of electrical current flow. Moreover, assemblies 126 are electrically configured to reduce voltage amplitude excursions as referenced to peak-to-peak voltages, in contrast to referencing the voltage excursions to ground, i.e., zero volts. As a result, assemblies 126 also facilitate voltage amplitude suppression during voltage amplitude excursions, and facilitate enhancing the efficiency of diodes 124. In the exemplary embodiment, the plurality of TVSs 134 facilitate a voltage threshold of 2600 volts, and each TVS 134 cooperates with resistors 136 to facilitate a combined resistance to electrical current flow of at least 1300 ohms. Both the voltage threshold and current resistance features ensure only a trickle current flows between terminals A and B of assemblies 126 when the voltage drop across diodes 124 is below the threshold voltage. Moreover, such voltage threshold and current resistance features facilitate pre-determined heat dissipation characteristics of assemblies 126.

A method of operating generator 102 includes providing brushless excitation system 100 including at least one rectifier 122 having at least one diode 124. The method also includes providing at least one voltage amplitude limiter assembly 126 including at least one resistor 136 and at least one transient voltage suppressor (TVS) 134 electrically coupled with at least one resistor 136 to form at least one voltage suppression unit 138. The method further includes transmitting an electrical signal having a current and a voltage to each voltage suppression unit 138, the voltage having an amplitude. The method also includes electrically coupling the at least one voltage amplitude limiter assembly 126 to the at least one diode 124. The method further includes transmitting the electrical signal through the rectifier 122 and the voltage suppression unit 138 such that voltage amplitude excursions of the electrical signal are facilitated to be reduced.

Specifically, during operation, each diode 124 permits electrical current flow in one direction and inhibits current flow in the opposite direction. During periods when electrical current flow is permitted, an output signal from each diode 124 has a predetermined voltage and current and each diode 124 is in a conductive state. As diodes 124 transition from the conductive state to the non-conductive state, a voltage excursion of the diode wheel output signal is generated that is sometimes referred to as a reverse recovery signal. Such voltage excursions or commutation voltage spikes, are transmitted from diodes 124 to generator field apparatus 128.

In the exemplary embodiment, the nominal output voltage of diode wheel 122 is between approximately 400 volts to 800 volts and while the voltage across each of diodes 124 remains below the predetermined voltage amplitude, i.e., a 2600 volt threshold, only a small leakage current flows through each assembly 126. Once the 2600 volt threshold is attained and/or exceeded due to a commutation voltage spike, an increased portion of the affected diode 124 output signal current flows through an associated assembly 126 which reduces the voltage excursion.

While assembly 126 is reducing the voltage excursion, each TVS 134 exhibits substantially linear voltage suppression response characteristics while reducing heat generation within assembly 126. Therefore, each TVS 134 operates to reduce the voltage excursion in tandem with every other TVS 134 with a substantially linear response proportional to the magnitude of the voltage amplitude excursion that exceeds 2600 volts. The response characteristics of resistors 136 are also substantially linear. As such, assembly 126 exhibits linear voltage response characteristics during voltage spike periods by facilitating a substantially linear relationship between an amount by which the diode electrical output signal voltage amplitude exceeds the predetermined voltage amplitude and an amount of diode electrical output signal current flowing through assembly 126. For example, as the amount by which the diode electrical output signal voltage amplitude exceeds the 2600 volts increases, the amount of diode electrical output signal current flowing through assembly 126 increases linearly such that the voltage transmitted to field apparatus 128 does not substantially exceed 2600 volts. Conversely, as the amount by which the diode electrical output signal voltage amplitude exceeds the 2600 volts decreases, the amount of diode electrical output signal current flowing through assembly 126 decreases linearly. Once the diode electrical output signal voltage amplitude no longer exceeds 2600 volts, the electric current flow through assembly 126 decreases to substantially a trickle current flow.

The methods and apparatus for reducing an electrical machine voltage amplitude excursion as described herein facilitates efficient operation and monitoring of an electrical machine. Specifically, such voltage amplitude limiter assemblies are configured to be efficiently and effectively integrated into existing brushless excitation apparatus. More specifically, the voltage amplitude limiter assembly described herein facilitates an efficient and effective electrical machine brushless excitation scheme by reducing voltage amplitude excursions while also reducing a footprint and mass within rotatable components. The voltage amplitude limiter assembly facilitates operation of a passive voltage amplitude excursion apparatus with self-contained components and no external power requirements. Further, the voltage amplitude limiter assembly also facilitates enhancing electrical machine reliability, and reducing maintenance costs and electrical machine outages by mitigating electrical insulation breakdown. Moreover, the voltage amplitude limiter assembly described herein may be embedded within brushless excitation systems of electric power generators and electric motors.

Exemplary embodiments of voltage amplitude limiter assemblies as associated with electrical machine brushless excitation schemes are described above in detail. The methods, apparatus and systems are not limited to the specific embodiments described herein nor to the specific illustrated electrical machine.

While the invention has been described in terms of various specific embodiments, those skilled in the art will recognize that the invention can be practiced with modification within the spirit and scope of the claims.

What is claimed is:

1. A method of operating an electrical machine comprising:
   providing a brushless excitation system including at least one rectifier having at least one diode;
   electrically coupling at least one voltage amplitude limiter assembly in parallel to each of the at least one diode, wherein the at least one voltage amplitude limiter assembly includes at least one voltage suppression unit that includes at least one resistor electrically coupled to at least one transient voltage suppressor;
   electrically coupling the at least one voltage amplitude limiter assembly and the at least one diode to an electrical signal source, wherein the at least one diode enables an electrical current flow in a first direction and inhibits current flow in a second direction that is opposite the first direction;
   receiving an electrical signal having a current and a voltage at each voltage amplitude limiter assembly, the voltage having an amplitude; and
   receiving the electrical signal at the rectifier and the voltage amplitude limiter assembly such that voltage amplitude excursions of the electrical signal are facilitated to be reduced.

2. A method in accordance with claim 1 wherein electrically coupling at least one voltage amplitude limiter assembly comprises embedding the at least one voltage amplitude limiter assembly within the at least one rectifier.

3. A method in accordance with claim 1 wherein providing a brushless excitation system comprises:
   providing at least one diode wheel rectifier; and
   removably coupling the at least one voltage amplitude limiter assembly to the at least one diode wheel rectifier.

4. A method in accordance with claim 1 wherein receiving the electrical signal further comprises reducing the electrical signal voltage amplitude to substantially equal the predetermined voltage amplitude.

5. A method in accordance with claim 4 wherein reducing the electrical signal voltage amplitude to substantially equal the predetermined voltage amplitude comprises:
   reducing at least a portion of the electrical signal current flowing through the at least one voltage amplitude limiter assembly when the electrical signal voltage amplitude is less than the predetermined voltage amplitude; and
   increasing at least a portion of the electrical signal current flowing through the at least one voltage amplitude limiter assembly when the electrical signal voltage amplitude exceeds the predetermined voltage amplitude.

6. A method in accordance with claim 5 wherein increasing at least a portion of the electrical signal current flowing through the at least one voltage amplitude limiter assembly comprises transmitting a substantially linear relationship between an amount of the electrical signal voltage amplitude exceeding the predetermined voltage amplitude and an amount of the electrical signal current flowing through the at least one voltage amplitude limiter assembly.

7. A voltage amplitude limiter assembly comprising:
   at least one diode; and
   a plurality of voltage suppression units that each comprise at least one transient voltage suppressor (TVS) electrically coupled in series to at least one resistor,
   said voltage amplitude limiter assembly configured to be electrically coupled to a rectifier and in parallel to said at least one diode, said at least one diode enables an electrical current flow in a first direction and substantially inhibits current flow in a second direction that is opposite the first direction, and
   wherein each of said plurality of voltage suppression units is further configured to reduce a voltage amplitude excursion of an electrical signal received at each of said plurality of voltage suppression units that exceeds a predetermined voltage amplitude.

8. A voltage amplitude limiter assembly in accordance with claim 7 wherein said at least one TVS is configured to facilitate reducing an electrical current flow through said at least one voltage suppression unit when the amplitude of the electrical signal is below the predetermined voltage amplitude.

9. A voltage amplitude limiter assembly in accordance with claim 7 wherein said at least one TVS is electrically bidirectional and is configured to produce a substantially linear response characteristic to a voltage amplitude excursion that exceeds the predetermined voltage amplitude.

10. A voltage amplitude limiter assembly in accordance with claim 7 wherein said at least one TVS has a reverse stand-off voltage of at least 130 volts.

11. A voltage amplitude limiter assembly in accordance with claim 7 wherein said at least one resistor has a resistance to electrical current flow of at least 65 ohms.

12. A voltage amplitude limiter assembly in accordance with claim 7 wherein said voltage amplitude limiter assembly comprises at least ten said voltage suppression units electrically coupled together.

13. A voltage amplitude limiter assembly in accordance with claim 12 wherein said voltage amplitude limiter assembly further has a resistance to electrical current flow of at least 1300 ohms and a reverse stand-off voltage of at least 2600 volts.

14. A brushless excitation system for an electrical machine, said electrical machine having an excitation field apparatus, said brushless excitation system comprising:
 an electrical power source;
 a diode rectifier, comprising at least one diode, said diode rectifier is electrically coupled to the electrical power source and the excitation field apparatus, wherein said at least one diode enables an electrical current flow in a first direction and substantially inhibits current flow in a second direction that is opposite the first direction; and
 at least one voltage amplitude limiter assembly electrically coupled to each of said at least one diode, said at least one voltage amplitude limiter assembly comprises a plurality of voltage suppression units that each comprise at least one resistor electrically coupled in series to at least one transient voltage suppressor (TVS), wherein each of said plurality of voltage suppression units is configured to reduce a voltage amplitude excursion of an electrical signal received that exceeds a predetermined voltage amplitude.

15. A brushless excitation system in accordance with claim 14 wherein said at least one TVS is configured to facilitate reducing an electrical current flow through said at least one voltage suppression unit when the amplitude of the electrical signal is below the predetermined voltage amplitude.

16. A brushless excitation system in accordance with claim 14 wherein said at least one TVS is electrically bidirectional and is configured to produce a substantially linear response characteristic to a voltage amplitude excursion that exceeds the predetermined voltage amplitude.

17. A brushless excitation system in accordance with claim 14 wherein said voltage amplitude limiter assembly comprises at least ten said voltage suppression units electrically coupled together.

18. A brushless excitation system in accordance with claim 17 wherein said voltage amplitude limiter assembly further has a resistance to electrical current flow of at least 1300 ohms and a reverse stand-off voltage of at least 2600 volts.

* * * * *